US012655654B2

(12) United States Patent
Qian

(10) Patent No.: US 12,655,654 B2
(45) Date of Patent: Jun. 16, 2026

(54) SMART LOCK KNOB POSITION DETECTION DEVICE

(71) Applicant: U-TEC GROUP INC., Union City, CA (US)

(72) Inventor: Lingling Qian, Union City, CA (US)

(73) Assignee: U-TEC GROUP INC., Union City, CA (US)

( * ) Notice: Subject to any disclaimer, the term of this patent is extended or adjusted under 35 U.S.C. 154(b) by 101 days.

(21) Appl. No.: 18/644,018

(22) Filed: Apr. 23, 2024

(65) Prior Publication Data

US 2025/0327333 A1 Oct. 23, 2025

(51) Int. Cl.
*E05B 17/22* (2006.01)
*E05B 47/00* (2006.01)

(52) U.S. Cl.
CPC ...... *E05B 17/22* (2013.01); *E05B 2047/0065* (2013.01); *E05B 2047/0067* (2013.01)

(58) Field of Classification Search
CPC ............. E05B 17/22; E05B 2047/0065; E05B 2047/0067
See application file for complete search history.

(56) References Cited

U.S. PATENT DOCUMENTS 9,316,022 B2 * 4/2016 Tyner ...................... E05B 17/22
9,528,295 B2 * 12/2016 Lowder ............... E05B 47/0001
11,462,062 B1 * 10/2022 Varn ...................... H01R 13/11
12,110,714 B1 * 10/2024 Situ ..................... E05B 47/0012
2015/0027178 A1 * 1/2015 Scalisi .................. E05B 47/026 292/144
2017/0002586 A1 * 1/2017 Lee ......................... E05B 39/00
2017/0243425 A1 * 8/2017 Meganck ........... G07C 9/00174
2019/0178003 A1 * 6/2019 Martin .................... E05B 15/02
2023/0072967 A1 * 3/2023 Lv ...................... G07C 9/00817
2024/0104986 A1 * 3/2024 Su ...................... G07C 9/00174

* cited by examiner

*Primary Examiner* — Mark A Williams
(74) *Attorney, Agent, or Firm* — Hawaii Patent Services; Nathaniel K. Fedde; Kenton N. Fedde

(57) ABSTRACT

The present invention relates to the field of smart lock technology, specifically a smart lock knob position detection device, comprising Hall effect sensors equidistantly placed around an semicircular opening of a printed circuit board, wherein inside the semicircular opening of the printed circuit board is provided a lower end portion of a rotary shaft, on the rotary shaft are provided magnets, and positive projection of the at least one magnet is located on a circumference formed by the Hall effect sensors, so that when the rotary shaft rotates to a position above the Hall effect sensors, the at least one magnet is directly above the Hall effect sensors. The present invention utilizes the Hall effect to achieve dynamic detection of smart lock knobs and realizes frequency conversion energy saving; meanwhile, the present invention offers a large detection range and long operational time, thereby enhancing the high-precision detection of positions of smart lock knobs, improves product performance, features a simple structure that is not easily damaged, and is suitable for long-term use.

3 Claims, 2 Drawing Sheets

SMART LOCK KNOB POSITION DETECTION DEVICE

TECHNICAL FIELD

The present invention relates to the field of smart lock technology, specifically a smart lock knob position detection device.

BACKGROUND TECHNOLOGY

Smart door locks refers to improved locks based on traditional mechanical locks, which are more intelligent and convenient in terms of user safety, identification, and management. Unlike traditional locks with singular functionality, smart door locks incorporate additional unlocking methods such as passwords, fingerprints, and radio frequency identification on top of traditional locking mechanisms.

With the advancement and complexity of functionalities, an increasing number of components and modules consume a large amount of power; in existing smart locks, knob detection is mostly achieved by using infrared detection technology, and the use of infrared components continuously emits information, leading to significant power consumption. However, insufficient power will result in unstable operation of internal components within smart locks and may even lead to component damage, thereby increasing maintenance costs. Frequent battery replacements also contribute to a less than optimal customer experience.

Based on the reasons mentioned above, the present invention has designed a smart lock knob position detection device, which utilizes the Hall effect to transmit detection information of smart lock knob positions to sensors, and achieves a high-precision, fast response, and wide-range detection without the need for prolonged power consumption.

SUMMARY OF THE INVENTION

The present invention aims to overcome shortcomings of the prior art, utilize the Hall effect to transmit detection information of smart lock knob positions to sensors, and achieve a high-precision, fast response, and wide-range detection without the need for prolonged power consumption.

Therefore, the present invention provides a smart lock knob position detection device, comprising at least one magnet, Hall effect sensors, a rotary shaft and a printed circuit board, wherein the Hall effect sensors are equidistantly placed around a semicircular opening of the printed circuit board, inside the semicircular opening of the printed circuit board is provided a lower end portion of the rotary shaft, on the rotary shaft is provided the at least one magnet, and positive projection of the at least one magnet is located on a circumference formed by the Hall effect sensors, so that when the rotary shaft rotates to a position above the Hall effect sensors, the at least one magnet is directly above the Hall effect sensors.

Further, the at least one magnet comprises at least one bar magnet.

Further, the Hall effect sensors comprise low power consumption sensors.

Compared to the prior art, in the present invention Hall effect sensors are arranged equidistantly to be cooperated with the at least one magnet vertically positioned on a rotary shaft, so that voltages generated by the Hall effect are transmitted to a printed circuit board for detecting smart lock knobs, the need for real-time provision of electrical signals is eliminated, power consumption is only necessary when the at least one magnet rotates above the Hall effect sensors, thus only low-power sensors are required and power usage is reduced; additionally, the Hall effect sensors can be placed within a semicircular range around the rotary shaft, enabling detection in any direction, thereby improving distance and accuracy of detection.

Figure 1:
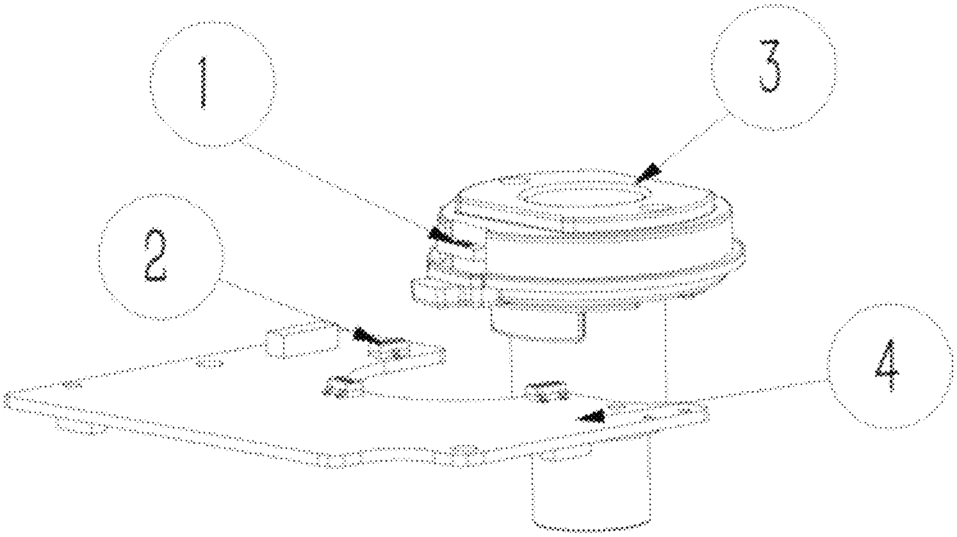
FIG. 1 is a schematic structural diagram of the present invention.

The markups in the drawings are indicated as follows:

1—magnet;

2—Hall effect sensor;

3—roatary shaft; and

4—printed circuit board.

SPECIFIC EMBODIMENTS

The present invention is further described in conjunction with the attached drawings.

Figure 2:
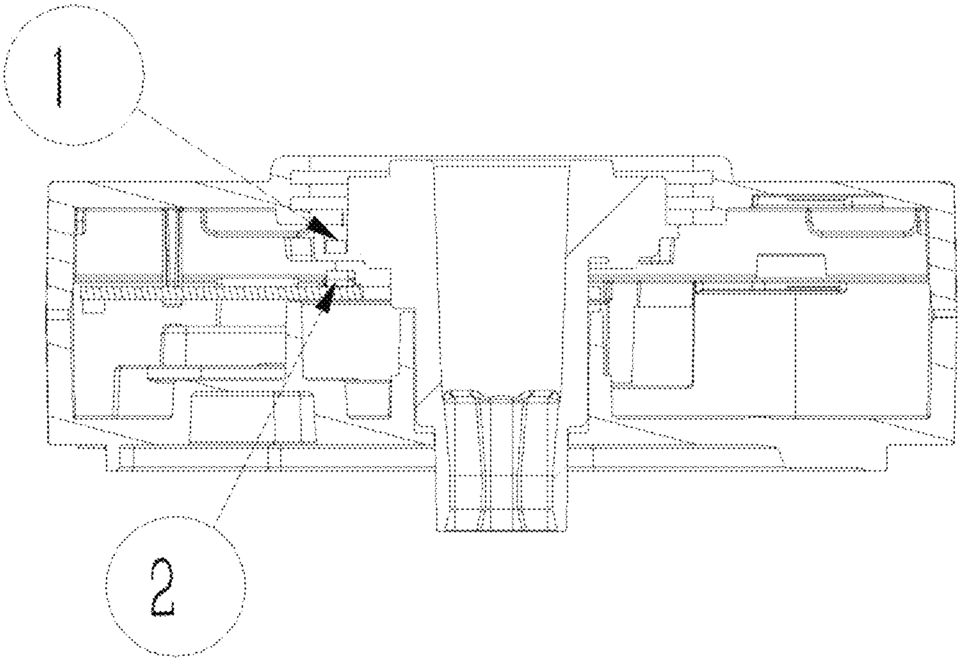
FIG. 2 is a side cross-sectional view of the present invention.
Figure 3:
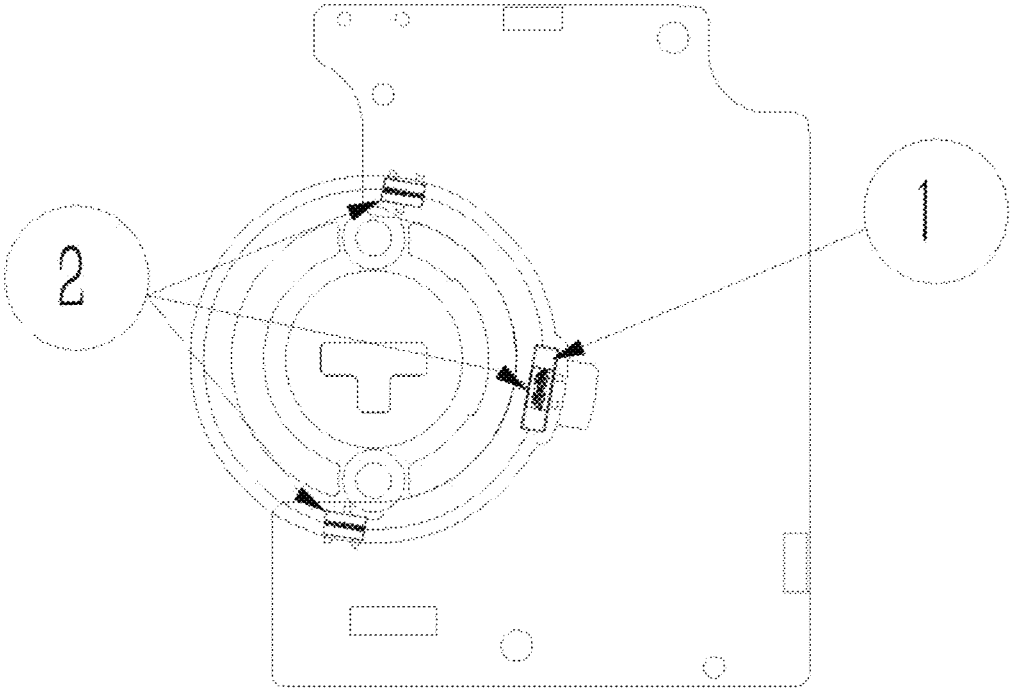
FIG. 3 is a schematic top view of the present invention.

Please refer to FIGS. 1-3, the present invention provides a smart lock knob position detection device, comprising at least one magnet 1, Hall effect sensors 2, a rotary shaft 3 and a printed circuit board 4, wherein the Hall effect sensors 2 are equidistantly placed around a semicircular opening of the printed circuit board 4, inside the semicircular opening of the printed circuit board 4 is provided a lower end portion of the rotary shaft 3, on the rotary shaft 3 is provided the at least one magnet 1, and positive projection of the at least one magnet 1 is located on a circumference formed by the Hall effect sensors 2, so that when the rotary shaft 3 rotates to a position above the Hall effect sensors 2, the at least one magnet 1 is directly above the Hall effect sensors 2.

Further, the at least one magnet 1 comprises at least one bar magnet.

Further, the Hall effect sensors comprise low power consumption sensors.

The present invention has following working principles:

In the present invention, Hall effect sensors 2 are equidistantly distributed along an semicircular opening of a printed circuit board 4, inside the semicircular opening of the printed circuit board 4 is provided a lower end portion of a rotary shaft 3, and on the rotary shaft 3 is provided at least one bar magnet 1; as the rotary shaft 3 rotates clockwise or counterclockwise, the at least one bar magnet 1 also rotates accordingly, and when the at least one bar magnet 1 rotates to a position directly above the Hall effect sensors 2 mounted on the printed circuit board 4, a voltage generated by the Hall effect is captured by the Hall effect sensors 2 and transmitted to the printed circuit board 4, thereby achieving detection of a smart lock knob position; since the Hall effect sensors 2 are low-power sensors, power is not consumed when the at least one bar magnet 1 does not affect magnetic field thereof, thus contributing to power savings; moreover, the equidistant distribution of the Hall effect sensors 2 ensures that regardless of the direction in which the rotary shaft 3 rotates, the at least one bar magnet 1 will trigger a response from the Hall effect sensor 2, thereby improving the distance, time, and success rate of detection.

The above are only preferred embodiments of the present invention, and are only used to help understand the method and its core idea of the present invention. The protection scope of the present invention is not limited to the above-mentioned embodiments, and all technical solutions falling under the idea of the present invention belong to the protection scope of the present invention. It should be pointed out that for those of ordinary skill in the art, several improvements and modifications may be made without departing from the principles of the present invention, and these improvements and modifications should also be regarded as the protection scope of the present invention.

In the description of the present invention, it should be noted that the orientation or positional relationship indicated by the terms "upper", "lower", "inner", "outer", etc. are based on the orientation or positional relationship shown in the drawings, which are only for the convenience of describing the present invention and simplifying the description, but do not indicate or imply that the device or element referred to must have a specific orientation, be constructed and operated in a specific orientation, and therefore cannot be construed as a limitation of the present invention.

The present invention overall solves the problem of high power consumption in smart lock knob detection in the prior art, utilizes the Hall effect to achieve dynamic detection of smart lock knobs and realizes frequency conversion energy saving; meanwhile, the present invention offers a large detection range and long operational time, thereby enhancing the high-precision detection of positions of smart lock knobs, improves product performance, features a simple structure that is not easily damaged, and is suitable for long-term use.

The invention claimed is:

1. A device for detecting position of a rotary shaft for a smart lock knob, comprising at least one magnet (1), Hall effect sensors (2), a rotary shaft (3) and a printed circuit board (4), wherein the Hall effect sensors (2) are equidistantly placed around a semicircular opening of the printed circuit board (4), inside the semicircular opening of the printed circuit board (4) is provided a lower end portion of the rotary shaft (3), on the rotary shaft (3) is provided the at least one magnet (1), and a positive projection of the at least one magnet (1) is located on a circumference formed by the Hall effect sensors (2), so that when the rotary shaft (3) rotates to change a position of the at least one magnet (1) by moving the at least one magnet (1) above the Hall effect sensors (2), voltage is generated due to Hall effects and is captured by the Hall effect sensors (2), and the voltage is transmitted to the printed circuit board (4).

2. The device according to claim 1, wherein the at least one magnet (1) comprises at least one bar magnet.

3. The device according to claim 1, wherein the Hall effect sensors comprise low power consumption sensors.

* * * * *